United States Patent
Karube et al.

(10) Patent No.: US 7,410,191 B2
(45) Date of Patent: Aug. 12, 2008

(54) FUEL TANK MOUNTING STRUCTURE IN SADDLE-RIDE TYPE VEHICLE

(75) Inventors: Shinichi Karube, Saitama (JP); Jeremy McGuire, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 384 days.

(21) Appl. No.: 11/216,158

(22) Filed: Sep. 1, 2005

(65) Prior Publication Data

US 2006/0049623 A1 Mar. 9, 2006

(30) Foreign Application Priority Data

Sep. 6, 2004 (JP) ............................. 2004-258976

(51) Int. Cl.
*B60P 3/22* (2006.01)
*B62D 61/02* (2006.01)

(52) U.S. Cl. .................. 280/833; 280/835; 280/834; 280/830; 180/219; 220/567.2; 248/214; 248/315.7; 224/413

(58) Field of Classification Search ............... 280/833, 280/835, 834, 830; 180/219; 220/567.2; 248/214, 316.7; 224/413
See application file for complete search history.

(56) References Cited

U.S. PATENT DOCUMENTS

| 3,926,274 | A | * | 12/1975 | Morioka et al. | ............. 180/219 |
| 4,717,163 | A | * | 1/1988 | Tsukiji | ...................... 280/835 |
| 5,330,028 | A | | 7/1994 | Handa et al. | |
| 6,213,514 | B1 | | 4/2001 | Natsume et al. | |
| 6,641,169 | B2 | * | 11/2003 | Fukunaga et al. | ........... 280/835 |
| 6,691,962 | B1 | * | 2/2004 | Krejci | ...................... 248/214 |
| 7,231,996 | B2 | * | 6/2007 | Karube et al. | ............ 180/69.24 |
| 7,252,170 | B2 | * | 8/2007 | Miyakozawa et al. | ........ 180/219 |

FOREIGN PATENT DOCUMENTS

| CA | 2216179 | 3/1999 |
| JP | 05-319342 A | 12/1993 |

* cited by examiner

*Primary Examiner*—Lesley D. Morris
*Assistant Examiner*—Marlon Arce-Diaz
(74) *Attorney, Agent, or Firm*—Birch, Stewart, Kolasch & Birch, LLP

(57) ABSTRACT

Tank mounting pieces are provided in a body frame for a fuel tank mounting structure for mounting a fuel tank to the body frame of a saddle-ride type vehicle. More particularly, an upper rear frame is provided, located under the fuel tank, with a band stay for mounting to the body frame in a bottom wall of the fuel tank. The band stay and the metallic tank mounting pieces are connected together through a band member to fix the fuel tank to the body frame.

19 Claims, 8 Drawing Sheets

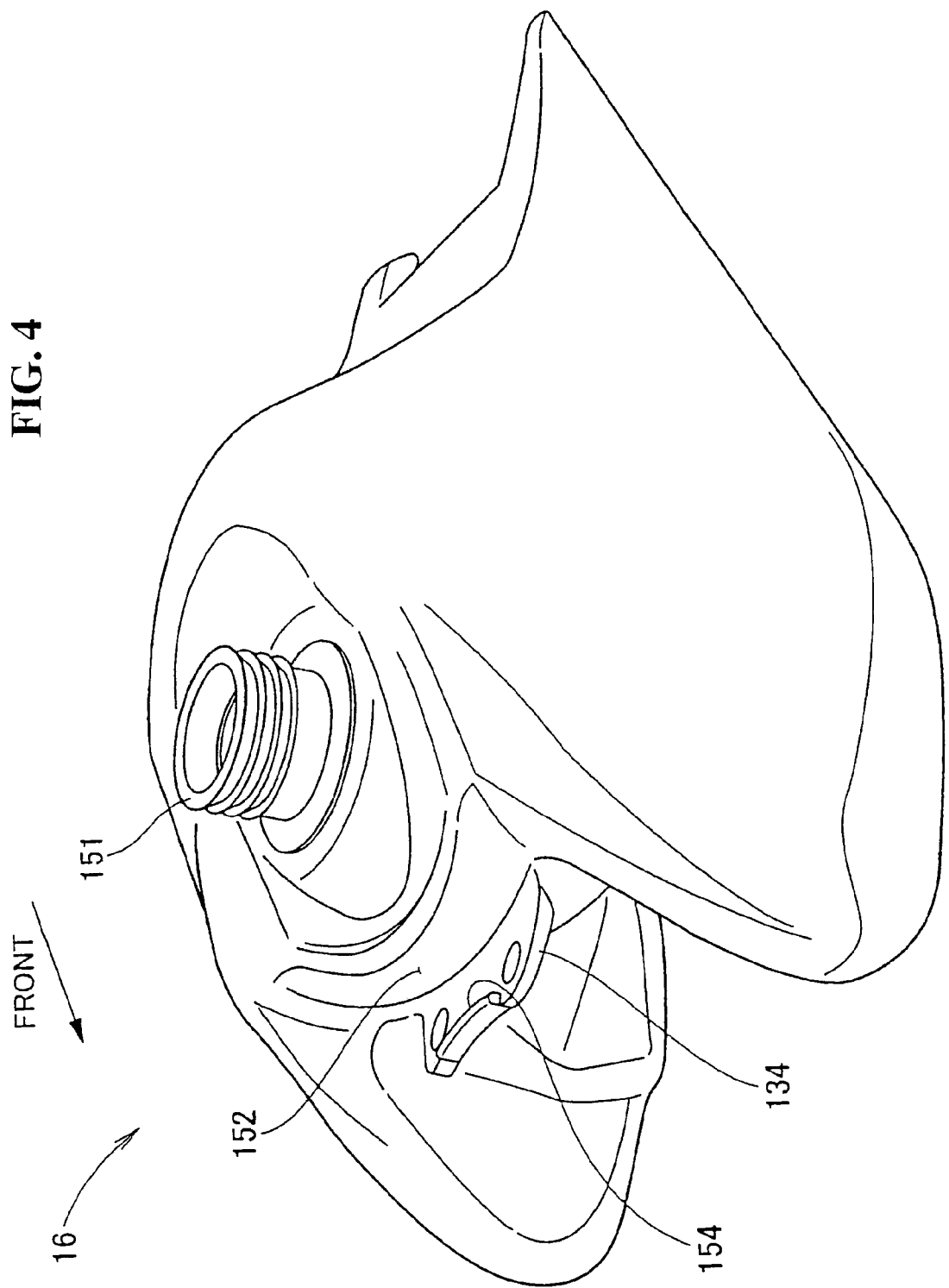

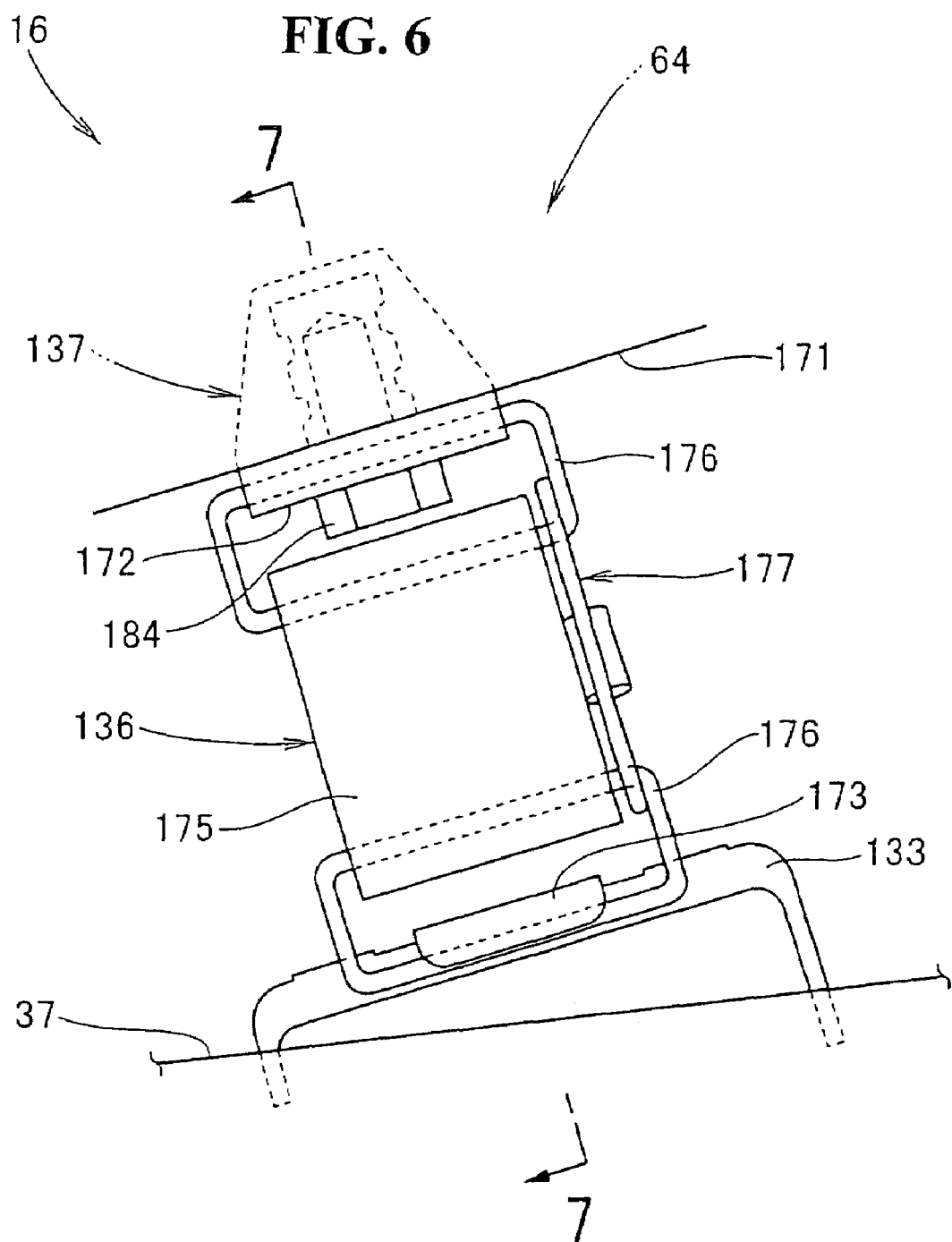

FUEL TANK MOUNTING STRUCTURE IN SADDLE-RIDE TYPE VEHICLE

CROSS-REFERENCE TO RELATED APPLICATIONS

The present non-provisional application claims priority under 35 USC 119 to Japanese Patent application No. 2004-258976 filed on Sep. 6, 2004 the entire contents thereof is hereby incorporated by reference.

BACKGROUND OF THE INVENTION

1. Field of the Invention

The present invention relates to a fuel tank mounting structure for a saddle-ride type vehicle.

2. Description of Background Art

A conventional fuel tank mounting structure for a saddle-ride type vehicle is known wherein a front portion of a fuel tank is bolted to a body frame and a rear portion of the fuel tank is secured to the body frame with use of a band. See, for example, Japanese Patent Laid-Open No. Hei 5-319342.

Japanese Patent Laid-Open No. Hei 5-319342 will be described below. The reference numerals used in the following description relating to Japanese Patent Laid-Open No. Hei 5-319342 are those referred to in the same literature.

As shown in FIGS. 2, 4 and 5 of Japanese Patent Laid-Open No. Hei 5-319342, a fuel tank (19) is provided in a front portion thereof with a mounting piece (34) and is also provided in both side portions thereof with hooks (32), (32). A mounting surface (19a) is provided in the fuel tank (19).

As shown in FIGS. 1 to 4 in Japanese Patent Laid-Open No. Hei 5-319342, a body frame (1) includes a cross member (35) disposed bridgewise between right and left front pipes (8), (8) for mounting the mounting piece (34) of the fuel tank (19) with a bolt (37) through a rubber piece (36). A mounting seat (29) is provided for receiving a mounting surface (19a) of the fuel tank (19) through a mounting rubber (30). A hook (31) is provided wherein a band (33) with one end thereof engaged with a hook (32) of the fuel tank (19) is brought into engagement at an opposite end thereof. A body cover (7) is provided for covering the fuel tank (19) sideways.

Since the fuel tank (19) is covered sideways with the body cover (7), the mounting portions provided in the front portion and also in both side portions of the fuel tank (19) for mounting of the tank to the body frame (1) are not visible from the exterior. However, for example when the body cover (7) is reduced in size in an effort to obtain an appearance of a motorcycle, the aforesaid mounting portions of the fuel tank (19) for mounting of the tank to the body frame (1) are exposed to the exterior and therefore it is necessary to take some measure for improving the appearance.

Also when feeding fuel to the fuel tank (19), it is desired to give some consideration to the flow of fuel leaking from the fuel tank.

SUMMARY AND OBJECTS OF THE INVENTION

It is an object of the present invention to improve an appearance in connection with a fuel tank mounting structure in a saddle-ride type vehicle.

According to an embodiment of the present invention, there is provided a fuel tank mounting structure in a saddle-ride type vehicle for mounting a fuel tank to a body frame of the saddle-ride type vehicle, including a lower bracket provided in the body frame which underlies the fuel tank and a band stay provided in a bottom wall of the fuel tank to mount the fuel tank to the body frame. The band stay and the lower bracket are connected together through a band member to fix the fuel tank to the body frame.

Since the bottom wall of the fuel tank and the lower bracket which underlies the fuel tank are connected together using a band member, the band member can be made less conspicuous.

According to an embodiment of the present invention, the fuel tank mounting structure preferably includes a side cover which covers the band member in a side view.

The band member can be made invisible in side view because it is covered with the side cover.

According to an embodiment of the present invention, preferably a recess which overlaps the body frame in side view is formed in a front portion of the fuel tank and a part of the recess includes a front bracket which is for mounting the fuel tank to the body frame.

The front bracket can be made invisible in a side view because it is provided in the recess formed in the front portion of the fuel tank.

According to an embodiment of the present invention, preferably the front bracket is provided at a front end thereof with an upwardly projecting vertical wall. A pair of right and left mounting rubber members are spaced apart from each other in the transverse direction of the vehicle and may be disposed between the vertical wall and a front wall of the fuel tank. The vertical wall and the mounting rubber members may be brought into close contact with each other so as to leave a gap neither between the vertical wall and the mounting rubber members nor between the front wall and the mounting rubber members. The front bracket may be secured to the body frame through the mounting rubber members.

The right and left mounting rubber members are disposed so as to leave no gap between them. Both the front wall and the vertical wall of the fuel tank, and the front bracket are secured to the body frame through the mounting rubber members. As a result, the front bracket becomes the bottom of the recess, while the front wall of the fuel tank, as well as the right and left mounting rubber pieces and the vertical wall, become side walls of the recess, whereby the recess can be easily formed.

According to an embodiment of the present invention, preferably the fuel tank is formed of resin and the band stay is bolted to the bottom wall.

The fuel tank formed of resin is reduced in weight. In addition, with the band stay bolted to the bottom wall and a band connected to the band stay, the structure is simplified.

According to an embodiment of the present invention, by connecting the bottom wall of the fuel tank with the lower bracket which underlies the fuel tank with use of the band member, the band member can be made less conspicuous and it is possible to improve the appearance of the saddle-ride type vehicle.

According to an embodiment of the present invention, since the fuel tank mounting structure includes a side cover which covers the band member in a side view, the band member can be made invisible in a side view and hence it is possible to improve the appearance of the saddle-ride type vehicle.

According to an embodiment of the present invention, since the front bracket is provided in the recess formed in the front portion of the fuel tank, the front bracket can be made invisible in a side view and hence it is possible to improve the appearance of the saddle-ride type vehicle.

According to an embodiment of the present invention, since the recess is formed by providing a vertical wall on a front end of the front bracket, the recess can be formed easily by merely applying the right and left mounting rubber members to the front wall of the fuel tank and the vertical wall without leaving any gap at the time of mounting the fuel tank.

According to an embodiment of the present invention, it is possible to attain a reduction in weight because the fuel tank is made of resin. The fuel tank mounting structure can be simplified because the band stay is bolted to the bottom wall of the fuel tank.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a perspective view of a fuel tank related to the present invention;

FIG. 6 is a side view showing a bottom mounting portion of the fuel tank;

DETAILED DESCRIPTION OF THE PREFERRED EMBODIMENTS

Figure 1:
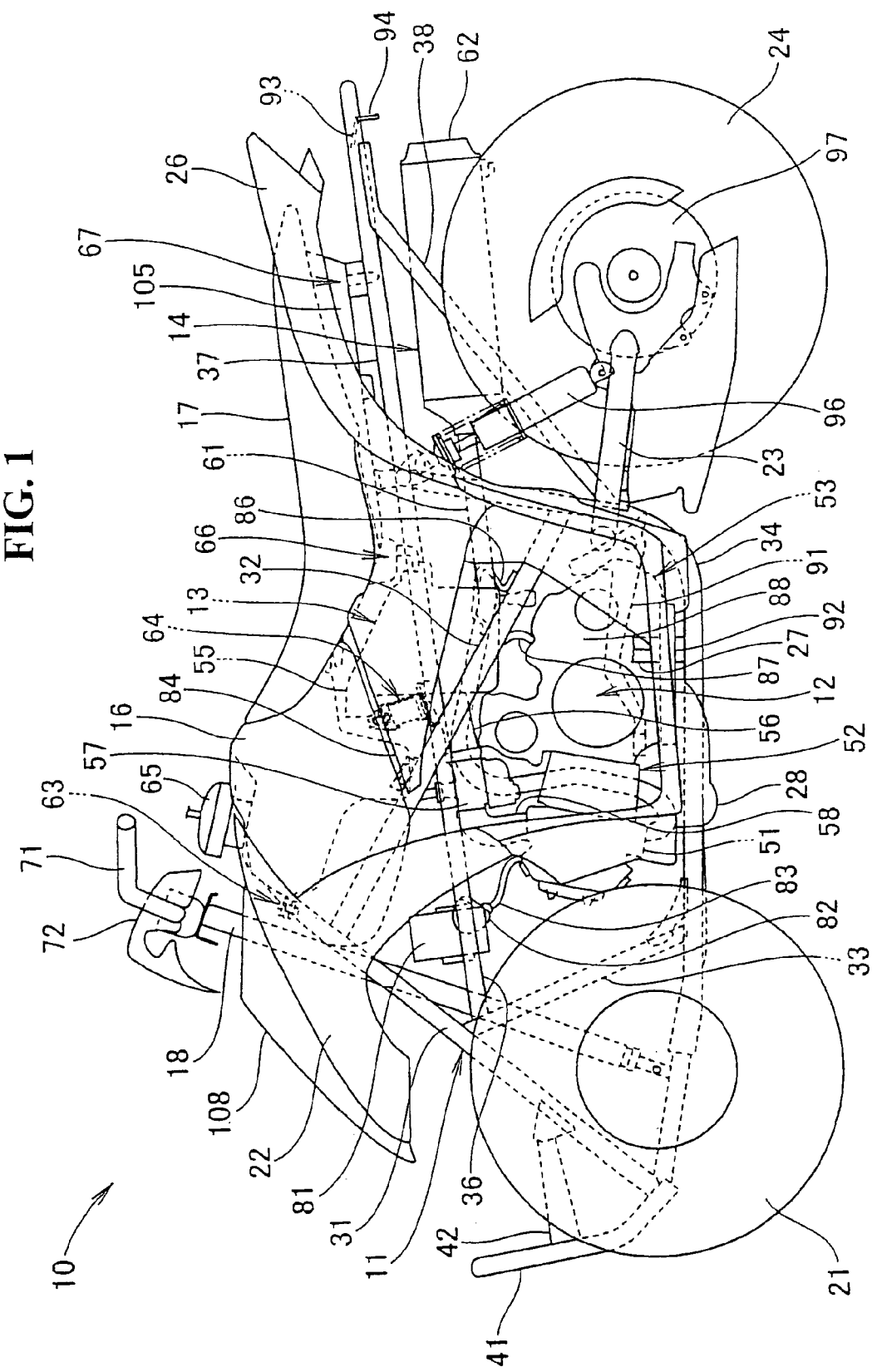
FIG. 1 is a side view of a saddle-ride type vehicle adopting a fuel tank mounting structure according to the present invention.

A best mode for carrying out the present invention will be described hereinunder with reference to the accompanying drawings. It is assumed that the drawings should be viewed in the direction of reference numerals.

FIG. 1 is a side view of a saddle-ride type vehicle having a fuel tank mounting structure according to the present invention. The saddle-ride type vehicle, indicated at 10, is a small-sized buggy including a body frame 11, a power unit 12, an intake unit 13 and an exhaust unit 14. A fuel tank 16 and a seat 17 are mounted relative to a steering shaft 18. Right and left front wheels 21 are mounted adjacent to right and left front fenders 22. Swing arms 23, right and left rear wheels 24, right and left rear fenders 26, and right and left foot boards 28 with foot rests 27 for a rider's feet are provided. The body frame 11 serves as a skeleton. The power unit 12 is disposed inside a lower portion of the body frame 11. The intake unit 13 and the exhaust unit 14 are both connected to the power unit 12. The fuel tank 16 and the seat 17 are both mounted to an upper portion of the body frame 11. The right and left front wheels 21 are mounted to a front portion of the body frame 11 steerably through the steering shaft 18. The right and left front fenders 22 cover upper and rear portions of the front wheels 21. The right and left rear wheels 24 are mounted to a lower rear portion of the body frame 11 and are vertically movably through swing arms 23. The right and left rear fenders 26 cover front and upper portions of the rear wheels 24. The foot boards 28 provides connections between the front fenders 22 and the rear fenders 26.

The body frame 11 includes a front frame 31, an upper inclined frame 32 and a lower inclined frame 33, a lower main frame 34, an upper front frame 36, an upper rear frame 37, and a rear inclined frame 38. These body frame components are each provided in a pair of right and left body frame components. The right and left components are connected through plural cross members (not shown). The front frame 31 is inclined so that an upper end thereof is positioned more to the rear relative to a lower end thereof. The upper inclined frame 32 and lower inclined frame 33 both extend rearwardly and obliquely downwardly from intermediate positions of the front frame 31. The lower main frame 34 is connected to a lower end of the front frame 31 and also to rear ends of the upper and lower inclined frames 32, 33 and rises at a rear portion thereof. The upper front frame 36 provides a connection between the upper and lower inclined frames 32, 33 somewhat rearwardly upwardly. The upper rear frame 37 extends somewhat rearwardly upwardly from an intermediate position of the upper inclined frame 32 and is connected at an intermediate position thereof to a rear end of the lower main frame 34. The rear inclined frame 38 is connected to both the lower main frame 34 and upper rear frame 37. A front bumper frame 41 and a bumper support frame 42 are provided.

The upper inclined frames 32 and the upper rear frames 37 are under-tank frames extending under the fuel tank 16.

The power unit 12 includes an engine 52, with the intake unit 13 and the exhaust unit 14 being connected to a cylinder head 51, and a transmission 53 being integral with the engine 52.

The intake unit 13 includes an air cleaner 55 for purifying intake air with a connecting tube 56 attached to a front portion of the air cleaner 55. A carburetor 57 is connected to a front end of the connecting tube 56, and an intake pipe 58 is connected to a front portion of the carburetor 57 and also to the cylinder head 51.

The exhaust unit 14 includes an exhaust pipe 61 extending upwardly and rearwardly from the cylinder head 51 and a muffler 62 connected to a rear end of the exhaust pipe 61.

The fuel tank 16 is a resin vessel whose front portion is attached to the front frames 31 through a front mounting portion 63 and whose bottom is attached to the upper rear frames 37 through a pair of right and left bottom mounting portions 64. A cap 65 is provided for closing a fuel inlet port.

The seat 17 is a member mounted removably to the upper rear frames 37. The seat 17 is retained and elastically supported on the upper rear frames 37 side by a pair of right and left front retaining portions 66 and is positioned and elastically supported on the upper rear frames 37 side by a pair of right and left rear positioning portions 67.

An upper portion of the steering shaft 18 is supported rotatably on the front frames 31 side, while a lower portion thereof is supported rotatably on the lower main frames 34 side, and a bar handle 71 is mounted to an upper end of the steering shaft 18. A handle cover 72 is mounted relative to the bar handle 71.

A CDI unit 81 is provided together with an ignition coil 82, a high-tension cord 83, and a side cover 84 integral formed with each rear fender 26. A guard member 86 is attached to an upper inclined frame 32 for covering the right side (inner side of the paper surface) in the vehicular transverse direction of the exhaust pipe 61. A blow-by hose 87 is provided for recycling blow-by gas from the interior of a crank case 88 of the power unit 12 to the air cleaner 55.

A brake pedal 91 is disposed on the right side in the vehicular transverse direction of the body frame 11. Right and left foot brackets 92 are attached respectively to the right and left floor main frames 34 to support the right and left foot boards 28. A pole stay 93 is attached to a rear end of an upper rear frame 37 to set up a pole. A reflector 94 is attached to a lower portion of the pole stay 93. A rear shock absorber 96 is provided. A drum brake 97 is attached to a rear end of each swing arm 23 to brake the associated rear wheel 24.

Figure 2:
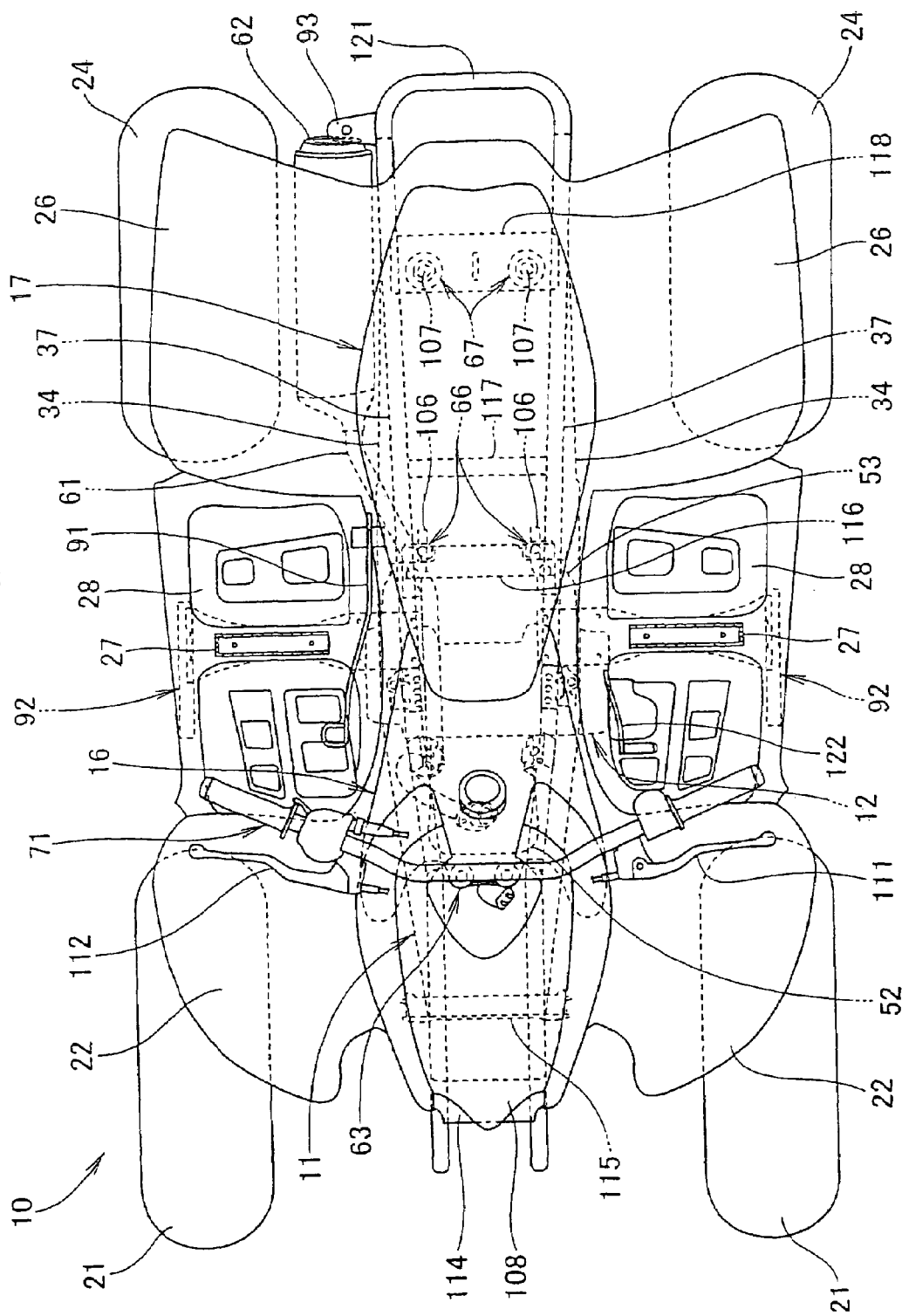
FIG. 2 is a plan view of the saddle-ride type vehicle.

FIG. 2 is a plan view of the saddle-ride type vehicle related to the present invention, wherein the fuel tank 16 has a shape that is wider at its front portion than at its rear portion in plan, with the front mounting portion 63 being provided centrally of the front portion.

A bottom plate 105 (see FIG. 1) of the seat 17 is provided with right and left hooks 106 which constitute the front retaining portions 66 and is also provided with right and left positioning lugs 107 which constitute the rear positioning portions 67.

A front cover 108 is integral provided in a central location with the right and left front fenders 22.

The foot rests 27 are mounted through foot boards 28 to generally L-shaped right and left foot brackets 92, permitting the rider to put his or her feet thereon.

The bar handle 71 is provided at a left front portion thereof with a rear brake lever 111 for actuating the drum brakes 97 (see FIG. 1) on the rear wheels side and is also provided at a right front portion thereof with a front brake lever 112 for actuating disc brakes (not shown) on the front wheels side. That is, the drum brakes 97 for the rear wheels can be actuated by both brake pedal 91 and rear brake lever 111.

Cross members 114 to 118 are provided in the body frame 11. A U-shaped cross pipe 121 is connected to rear ends of the right and left upper rear frames 37. A change pedal for shift 122 is provided.

Figure 3:
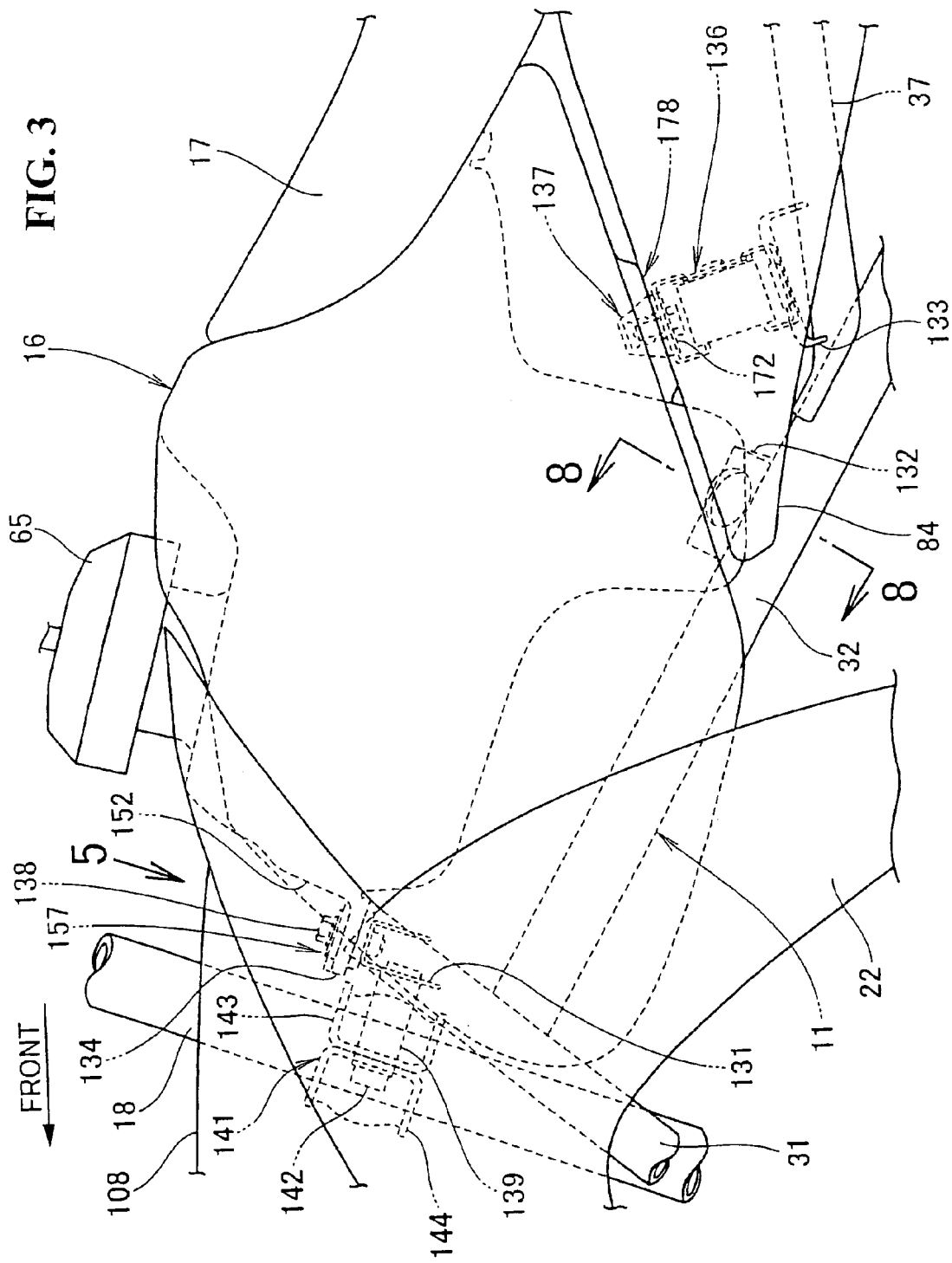
FIG. 3 is a side view of a principal portion in a front portion of a vehicle body, showing the fuel tank mounting structure.

FIG. 3 is a side view of a principal portion of the vehicle body front portion, showing the fuel tank mounting structure according to the present invention (the arrow FRONT in the figure represents the front side of the vehicle, also in the following). On the body frame 11 side, a cross member 131 having a generally U-shaped cross section is connected to upper end portions of the right and left front frames 31. A pair of metallic tank support pieces 132 (only the one 132 located on this side is shown) are attached to intermediate positions of the pair of right and left upper inclined frames 32, respectively. In addition, a pair of metallic tank mounting pieces 133 (only the one 133 located on this side is shown) are attached to front end portions of the pair of right and left upper rear frames 37. On the fuel tank 16 side, a forwardly projecting tank bracket 134 is provided in the front portion of the tank and a bearing surface (not shown) for abutment against the metallic tank support pieces 132, as well as a band mounting portion 137 to be mounted to the metallic tank mounting pieces 133 through a band member 136, are provided in the bottom portion of the tank.

FIG. 3 shows a state in which the tank bracket 134 is secured to the cross member 131 with a pair of bolts 138 (only the one 138 located on this side is shown) and the band mounting portion 137 is mounted to the metallic tank mounting pieces 133 by the band member 136 while applying the mounting seat of the fuel tank 16 to the metallic tank support pieces 132.

The cross member 131 is provided with a pair of right and left front projecting portions 139. A shaft bracket 141 for rotatably supporting the steering shaft 18 rotatably is secured to the front projecting portions 139 with bolts 142. The shaft bracket 141 includes two bracket pieces 143 and 144 to support the steering shaft 18 in a sandwiching manner through a bearing (not shown).

FIG. 4 is a perspective view of the fuel tank related to the present invention. The fuel tank 16 is provided in an upper portion thereof with a fuel feed port 151, and a front wall 152 is positioned in front of the fuel feed port 151. The tank bracket 134, which projects forward, is formed integrally with the front wall 152 and a vertical wall 154 extending substantially in the transverse direction of the vehicle body is integrally formed by molding at a front end of the tank bracket 134.

Figure 5A:
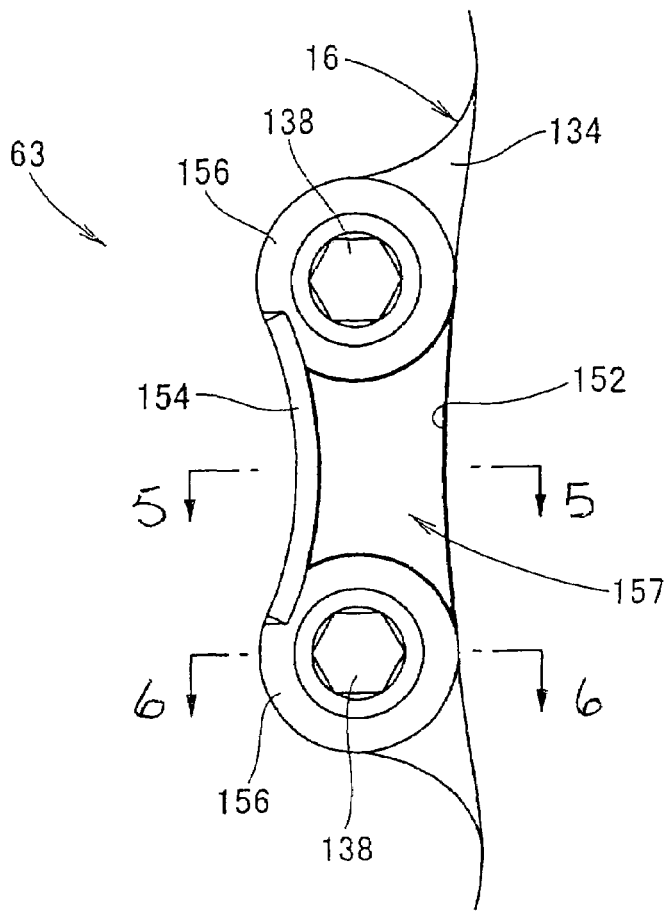
FIGS. 5(a) to 5(c) are explanatory diagrams showing a front mounting portion of the fuel tank.
Figure 5B:
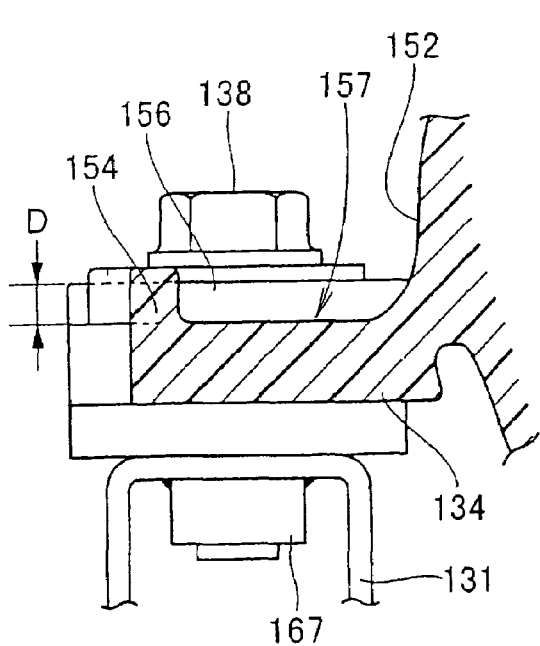
Figure 5C:
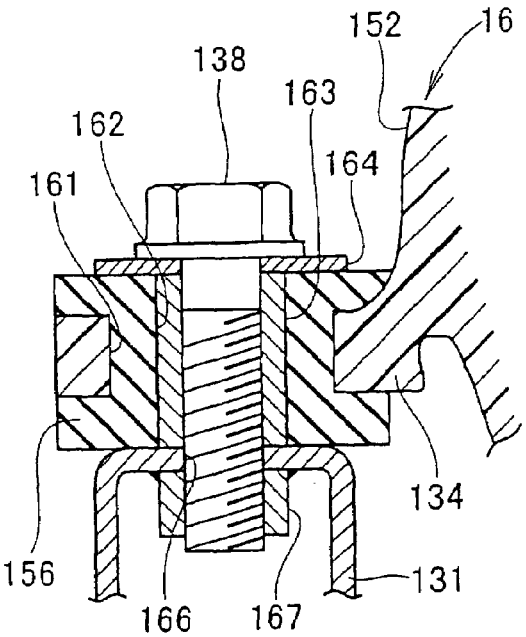

FIGS. 5(a) to 5(c) are explanatory diagrams showing the front mounting portion of the fuel tank related to the present invention.

FIG. 5(a) is a view as seen in the direction of arrow 5 in FIG. 3. A pair of right and left mounting rubber members 156 are disposed between the front wall 152 and the vertical wall 154 of the fuel tank 16 without leaving any gap. With this arrangement, a generally rectangular side wall is formed by the front wall 152, vertical wall 154 and tank mounting rubber members 156, and there also is formed a recess 157 (a profile portion indicated by a thick line) whose bottom wall is formed by the tank bracket 134.

FIG. 5(b) is a sectional view taken on line 5-5 in FIG. 5(a), showing that a recess 157 having a depth of D could be formed. The depth D is equal to the height of each tank mounting rubber member 156 tightened with bolt 138 from the tank bracket 134.

FIG. 5(c) is a sectional view taken on line 6-6 in FIG. 5(a), showing a state in which the tank mounting rubber members 156 are fitted in mounting holes 161 formed in the tank bracket 134. A cylindrical collar 163 is inserted into a rubber through hole 162 formed in each tank mounting rubber member 156. A washer 164 is put on upper end faces of the tank mounting rubber member 156 and the collar 163. A lower end face of the collar 163 abuts against the cross member 131. A bolt 138 is passed successively through the washer 164, the collar 163 and a through hole 166 formed in the cross member 131 and is threadedly engaged into a nut 167 which is mounted inside the cross member 131, thereby mounting the tank bracket 134 of the fuel tank 16 to the cross member 131.

FIG. 6 is a side view showing a bottom mounting portion of the fuel tank relating to the present invention. A band mounting portion 137 is provided on a bottom surface 171 of the fuel tank 16, and a band stay 172 is attached to the band mounting portion 137. One end of a band member 136 is connected to the band stay 172, while an opposite end of the band member 136 is brought into engagement with a hook portion 173 of a metallic tank mounting piece 133.

The band member 136 includes a rubber band body 175, rectangular connecting members 176 attached to both ends of the band body 175, and an endless link member 177 disposed bridgewise between the connecting members 176.

Figure 7:
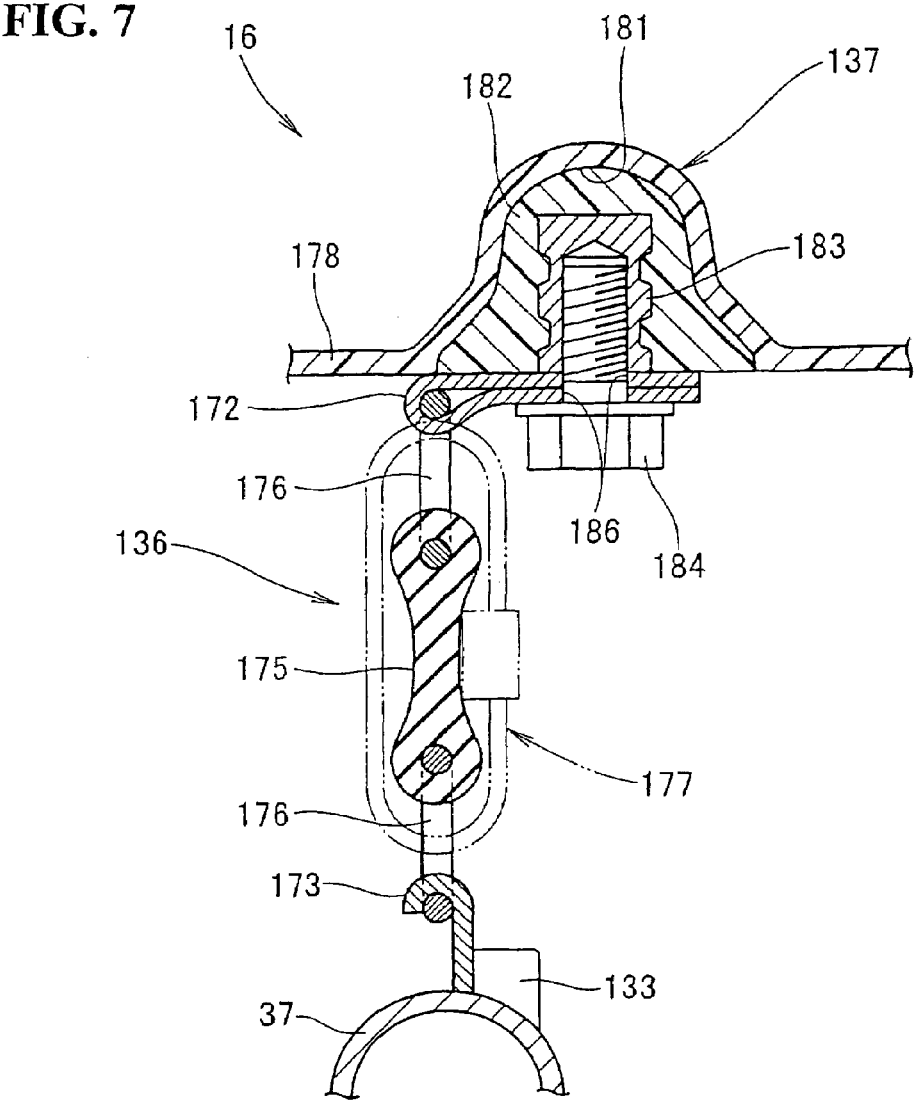
FIG. 7 is a sectional view taken along line 7-7 in FIG. 6.

FIG. 7 is a sectional view taken on line 7-7 in FIG. 6. The band mounting portion 137 includes a bottom recess 181 formed by depressing a bottom wall 178 of the fuel tank 16. A resin material 182 is poured into the bottom recess 181 with a metallic insert 183 embedded in the resin material 182. FIG. 7 shows a state in which a bolt 184 is threadedly inserted into an internally threaded hole formed in the metallic insert 183 to clamp the band stay 172 to the band mounting portion 137.

The band stay 172 is a member formed by bending a single plate to swingably hold therein one connecting member 176. The band stay 172 has a pair of bolt inserting holes 186 for insertion therethrough of the bolt 184.

Figure 8:
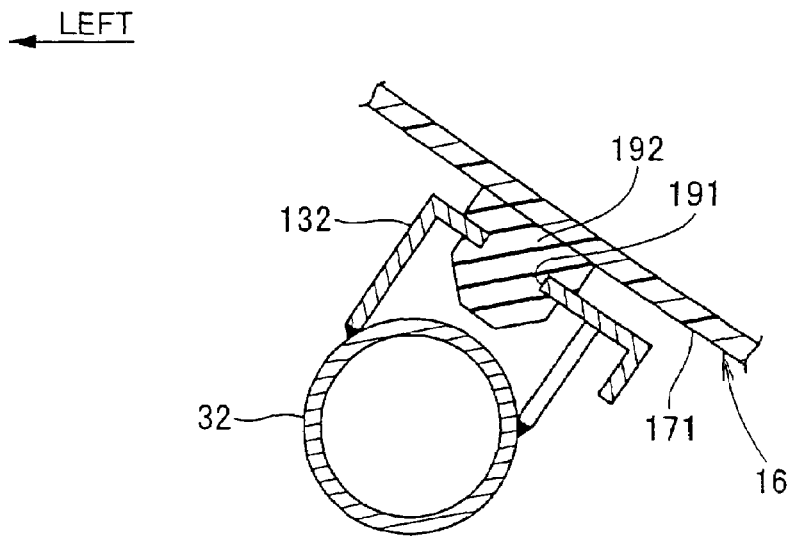
FIG. 8 is a sectional view taken along line 8-8 in FIG. 3.

FIG. 8 is a sectional view taken on line 8-8 in FIG. 3 (the arrow LEFT in the figure represents the left side of the vehicle body, i.e., outer side in the transverse direction of the vehicle body). FIG. 8 shows a state in which each metallic tank support piece 132 is attached to the associated upper inclined frame 32, a rubber inserting hole 191 is formed in the metallic tank support piece 132, and a tank supporting rubber member 192 is fitted in the rubber inserting hole 191 to support the bottom surface 171 as a bearing surface of the fuel tank 16. Such a tank support structure is provided right and left of the body frame 11.

The following description is now provided about the operation of the recess 157 of the fuel tank 16 constructed as above.

Figure 9:
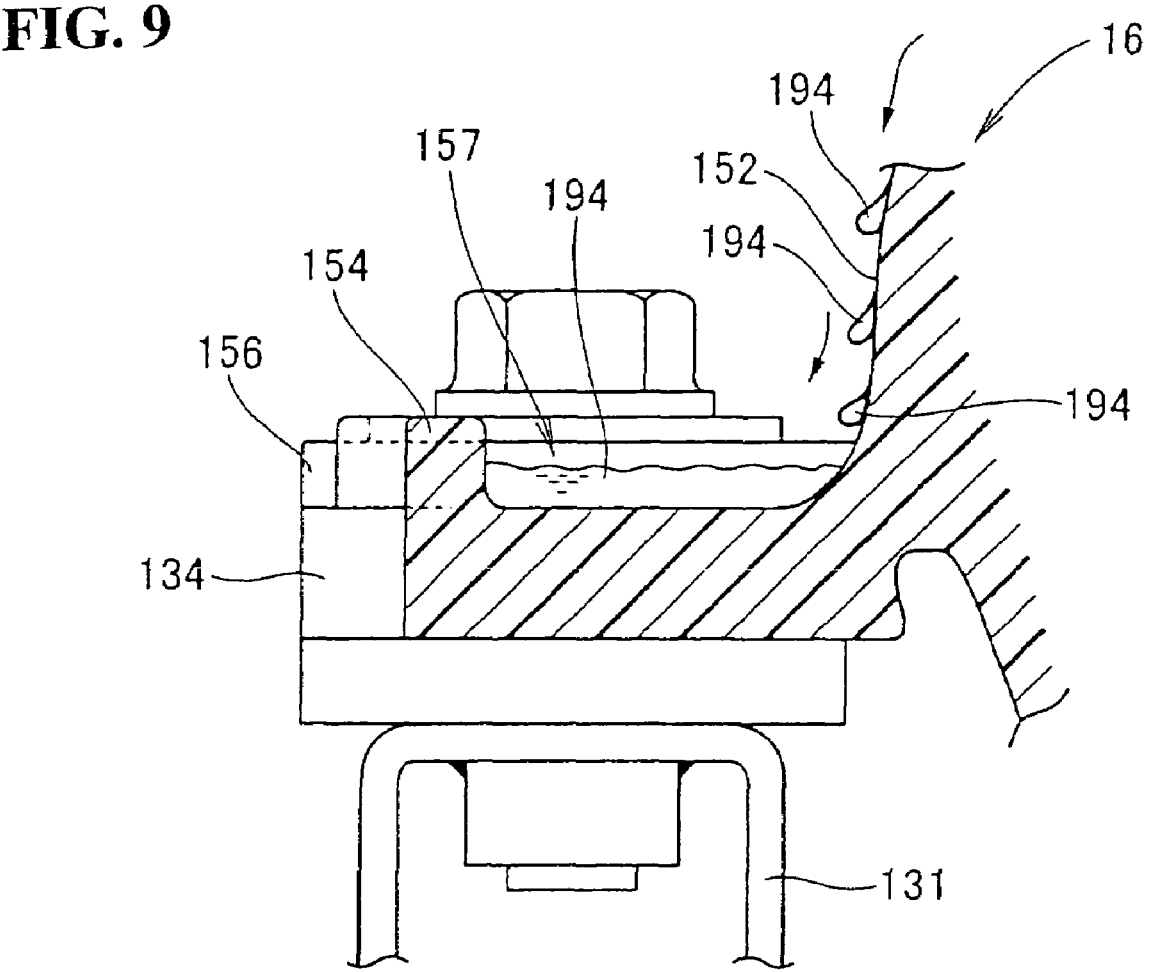
FIG. 9 is an operation diagram showing the operation of a recess formed in the fuel tank.

FIG. 9 is an operation diagram showing the operation of the recess of the fuel tank related to the present invention.

For example, at the time of feeding fuel to the fuel tank in FIG. 4, if fuel 194 drops to the front wall 152 from the fuel feed port 151 as indicated by arrows in FIG. 9, the fuel 194 drops along the front wall 152 into the recess 157 and stays therein. Thus, the fuel never drops downward from the fuel tank 16 and hence there is no fear of the fuel 194 reaching electric parts such as the ignition coil 82 (see FIGS. 1 and 2).

As described above in connection with FIGS. 3, 5 and 7, an embodiment of the present invention provides a fuel tank mounting structure for mounting the fuel tank 16 to the body frame 11 in the saddle-ride type vehicle 10 (see FIG. 1). The metallic tank mounting pieces 133 are provided as lower brackets in the body frame 11, more particularly, the upper rear frames 37, positioned under the fuel tank 16. The band stay 172 for mounting to the body frame 11 is provided in the bottom wall 178 of the fuel tank 16. The band stay 172 and the metallic tank mounting pieces 133 are connected together by the band member 136 to fix the fuel tank 16 to the body frame 11.

By connecting the bottom wall 178 of the fuel tank 16 and the body frame 11 located under the fuel tank 16 with each other through the band member 136, the band member can be made less conspicuous. Thus, it is possible to improve the appearance of the saddle-ride type vehicle.

An embodiment of the present invention includes the side cover 84 which covers the band member 136 in side view.

Since the fuel tank mounting structure has the side cover 84 which covers the band member 136 in the side view, the band member 136 can be made invisible in the side view. Thus, it is possible to improve the appearance of the saddle-ride type vehicle 10.

An embodiment of the present invention includes the recess 157 which overlaps the body frame 11, more particularly the upper portion of the front frame 31, in the side view that is formed in the front portion of the fuel tank 16. A part of the recess 157 includes the tank bracket 134 as a front bracket for mounting the fuel tank 16 to the body frame 11.

Since the tank bracket 134 is provided in the recess 157 formed in the front portion of the fuel tank 16, the tank bracket 134 can be made invisible in a side view. Thus, it is possible to improve the appearance of the saddle-ride type vehicle 10.

Moreover, since the recess 157 is formed in the fuel tank 16, the fuel 194 spilling during the feed thereof (see FIG. 9) can be prevented from dropping downward directly from the fuel tank 16. Thus, it is possible to prevent the fuel 194 from reaching electric parts such as the ignition coil 82 (see FIGS. 1 and 2) and other parts.

An embodiment of the present invention includes the upwardly projecting vertical wall 154 that is formed on the front end of the tank bracket 134 with the tank mounting rubber members 156 spaced apart in the vehicular transverse direction that are disposed between the vertical wall 154 and the front wall 152 of the fuel tank 16. The tank mounting rubber members 156 are brought into close contact with the vertical wall 154 and the front wall 152 so as to leave a gap neither between the vertical wall 154 and the tank mounting rubbers 156 nor between the front wall 152 and the tank mounting rubbers 156. In this state the tank bracket 134 is mounted to the body frame 11, more particularly the cross member 131, through the pair of right and left tank mounting rubber members 156.

Since the recess 157 is formed by providing the vertical wall 154 on the front end of the tank bracket 134, the recess 157 can be formed easily by merely bringing the right and left tank mounting rubber members 156 into close contact with the front wall 152 and vertical wall 154 of the fuel tank 16 without leaving any gap.

For example, if the whole of the recess is formed integrally with the fuel tank, then when forming the fuel tank with use of a mold, the shape of the mold becomes complicated, resulting in an increase in the cost. However, in the present invention, since the recess 157 is formed by utilizing the tank mounting rubber members 156 which are for mounting the fuel tank 16 to the body frame 11, it is possible to reduce the cost.

An embodiment of the present invention includes the fuel tank 16 that is formed of resin and the band stay 172 that is bolted to the bottom wall 178.

Since the fuel tank 16 is formed of resin, it is possible to attain a reduction in the weight, and since the band stay 172 is bolted to the bottom wall 178, it is possible to simplify the fuel tank mounting structure.

Although in this embodiment the vertical wall 154 is formed integrally with the tank bracket 134 as shown in FIG. 4, this constitutes no limitation. A vertical wall separate from the tank bracket 134 may be attached to the front end of the tank bracket 134.

The fuel tank mounting structure of the present invention is suitable for a saddle-ride type vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel tank mounting structure in a saddle-ride vehicle for mounting a fuel tank to a body frame of the saddle-ride vehicle, comprising:
   a lower bracket provided in the body frame which underlies said fuel tank; and
   a band stay provided in a bottom wall of said fuel tank to mount the fuel tank to said body frame,
   wherein said band stay and said lower bracket are connected together through a band member to fix said fuel tank to said body frame,
   wherein said fuel tank is formed of resin and said band stay is bolted to said bottom wall.

2. The fuel tank mounting structure in a saddle-ride vehicle according to claim 1, and further including a side cover for covering said band member in a side view.

3. The fuel tank mounting structure in a saddle-ride vehicle according to claim 1, wherein a recess which overlaps said body frame in a side view is formed in a front portion of said fuel tank and a part of said recess is constituted by a front bracket for mounting said fuel tank to said body frame.

4. The fuel tank mounting structure in a saddle-ride vehicle according to claim 2, wherein a recess which overlaps said body frame in a side view is formed in a front portion of said fuel tank and a part of said recess is constituted by a front bracket which is for mounting said fuel tank to said body frame.

5. The fuel tank mounting structure in a saddle-ride vehicle according to claim 3, wherein said front bracket is provided at a front end thereof with an upwardly projecting vertical wall, a pair of right and left mounting rubber members spaced apart from each other in the transverse direction of the vehicle are disposed between said vertical wall and a front wall of said fuel tank, said vertical wall and said mounting rubber members are brought into close contact with each other so as to leave a gap neither between the vertical wall and the mounting rubber members nor between the front wall and the mounting rubber members, and said front bracket is secured to said body frame through said mounting rubber members.

6. The fuel tank mounting structure in a saddle-ride vehicle according to claim 4, wherein said front bracket is provided at a front end thereof with an upwardly projecting vertical wall, a pair of right and left mounting rubber members spaced apart from each other in the transverse direction of the vehicle are disposed between said vertical wall and a front wall of said fuel tank, said vertical wall and said mounting rubber members are brought into close contact with each other so as to leave a gap neither between the vertical wall and the mounting rubber members nor between the front wall and the mounting rubber members, and said front bracket is secured to said body frame through said mounting rubber members.

7. A fuel tank mounting structure for mounting a fuel tank to a body frame of a vehicle, comprising:
   a band stay operatively connected to a bottom wall of said fuel tank to mount the fuel tank to the body frame;
   a band member secured to said band stay for connecting the band stay to the body frame for fixing the fuel tank to the body frame,
   wherein said fuel tank is formed of resin and said band stay is bolted to said bottom wall.

8. The fuel tank mounting structure according to claim 7, and further including a side cover for covering said band member in a side view.

9. The fuel tank mounting structure according to claim 7, wherein a recess which overlaps said body frame in a side view is formed in a front portion of said fuel tank and a part of said recess is constituted by a front bracket for mounting said fuel tank to said body frame.

10. The fuel tank mounting structure according to claim 8, wherein a recess which overlaps said body frame in a side view is formed in a front portion of said fuel tank and a part of said recess is constituted by a front bracket which is for mounting said fuel tank to said body frame.

11. The fuel tank mounting structure according to claim 9, wherein said front bracket is provided at a front end thereof with an upwardly projecting vertical wall, a pair of right and left mounting rubber members spaced apart from each other in the transverse direction of the vehicle are disposed between said vertical wall and a front wall of said fuel tank, said vertical wall and said mounting rubber members are brought into close contact with each other so as to leave a gap neither between the vertical wall and the mounting rubber members nor between the front wall and the mounting rubber members, and said front bracket is secured to said body frame through said mounting rubber members.

12. The fuel tank mounting structure according to claim 10, wherein said front bracket is provided at a front end thereof with an upwardly projecting vertical wall, a pair of right and left mounting rubber members spaced apart from each other in the transverse direction of the vehicle are disposed between said vertical wall and a front wall of said fuel tank, said vertical wall and said mounting rubber members are brought into close contact with each other so as to leave a gap neither between the vertical wall and the mounting rubber members nor between the front wall and the mounting rubber members, and said front bracket is secured to said body frame through said mounting rubber members.

13. The fuel tank mounting structure in a saddle-ride vehicle according to claim 1, wherein the band member includes a rubber band body, rectangular connecting members attached to both ends of the band body, and an endless link member disposed bridgewise between the connecting members.

14. The fuel tank mounting structure according to claim 7, wherein the band member includes a rubber band body, rectangular connecting members attached to both ends of the band body, and an endless link member disposed bridgewise between the connecting members.

15. The fuel tank mounting structure in a saddle-ride vehicle according to claim 1, wherein the band member extends downwardly and rearwardly from the band stay to the lower bracket, so that the fuel tank is solidly mounted to the body frame.

16. The fuel tank mounting structure according to claim 7, wherein the band member extends downwardly and rearwardly from the band stay to a lower bracket on the body frame, so that the fuel tank is solidly mounted to the body frame.

17. The fuel tank mounting structure in a saddle-ride vehicle according to claim 1, wherein the fuel tank is held to the body frame at three points.

18. The fuel tank mounting structure according to claim 7, wherein the fuel tank is held to the, body frame at three points.

19. A fuel tank mounting structure for mounting a fuel tank to a body frame of a vehicle, comprising:
   a band stay operatively connected to a bottom wall of said fuel tank to mount the fuel tank to the body frame;
   a band member secured to said band stay for connecting the band stay to the body frame for fixing the fuel tank to the body frame,
   wherein a recess which overlaps said body frame in a side view is formed in a front portion of said fuel tank and a part of said recess is constituted by a front bracket for mounting said fuel tank to said body frame, and
   wherein said front bracket is provided at a front end thereof with an upwardly projecting vertical wall, a pair of right and left mounting rubber members spaced apart from each other in the transverse direction of the vehicle are disposed between said vertical wall and a front wall of said fuel tank, said vertical wall and said mounting rubber members are brought into close contact with each other so as to leave a gap neither between the vertical wall and the mounting rubber members nor between the front wall and the mounting rubber members, and said front bracket is secured to said body frame through said mounting rubber members.

* * * * *